(12) United States Patent
Liu et al.

(10) Patent No.: US 8,082,752 B2
(45) Date of Patent: Dec. 27, 2011

(54) PRESSURE-REDUCING MODULE FOR DUAL EVAPORATOR AIR CONDITIONING SYSTEM

(75) Inventors: Jin-Ming Liu, Conflans Saint Honorine (FR); Mohamed Yahia, Paris (FR)

(73) Assignee: Valeo Systemes Thermiques S.A.S., Le Mesnil St. Denis (FR)

( * ) Notice: Subject to any disclaimer, the term of this patent is extended or adjusted under 35 U.S.C. 154(b) by 342 days.

(21) Appl. No.: 11/648,974

(22) Filed: Jan. 3, 2007

(65) Prior Publication Data

US 2007/0151287 A1 Jul. 5, 2007

(30) Foreign Application Priority Data

Jan. 4, 2006 (FR) ...................................... 06 00059

(51) Int. Cl.
*F25B 39/02* (2006.01)
(52) U.S. Cl. ................ 62/525; 62/115; 62/498
(58) Field of Classification Search .................... 62/525, 62/524, 467, 86, 115, 117, 200, 199, 498
See application file for complete search history.

(56) References Cited

U.S. PATENT DOCUMENTS

| | | | | |
|---|---|---|---|---|
| 4,506,516 A * | 3/1985 | Lord | ................. | 62/117 |
| 4,644,756 A * | 2/1987 | Sugimoto et al. | ............... | 62/160 |
| 4,981,023 A * | 1/1991 | Krishnakumar et al. | ....... | 62/498 |
| 5,582,236 A * | 12/1996 | Eike et al. | ........................ | 165/43 |
| 6,082,128 A * | 7/2000 | Lake et al. | .................... | 62/324.6 |
| 6,092,379 A * | 7/2000 | Nishida et al. | .................. | 62/200 |
| 6,185,948 B1 * | 2/2001 | Niki et al. | ........................ | 62/199 |
| 6,334,324 B1 * | 1/2002 | Muta et al. | ...................... | 62/222 |
| 6,463,222 B1 | 10/2002 | Ito et al. | | |
| 7,392,659 B2 * | 7/2008 | Hong et al. | ..................... | 62/115 |
| 2002/0043073 A1 * | 4/2002 | Park et al. | ....................... | 62/231 |
| 2004/0206109 A1 * | 10/2004 | Nishiwaki et al. | ............... | 62/468 |
| 2004/0237548 A1 * | 12/2004 | Ben Yahia | ....................... | 62/222 |

FOREIGN PATENT DOCUMENTS

| | | |
|---|---|---|
| DE | 1935194 A1 | 1/1971 |
| DE | 4333421 A1 | 4/1995 |
| DE | 10306395 A1 | 8/2004 |
| EP | 0625684 A | 11/1994 |
| JP | 2003 065635 | 7/2003 |

* cited by examiner

*Primary Examiner* — Melvin Jones
(74) *Attorney, Agent, or Firm* — Howard & Howard Attorneys PLLC

(57) ABSTRACT

The invention proposes a pressure-reducing module for an air conditioning circuit (10) through which a supercritical refrigerant flows. The module is connected to the circuit via one inlet and two outlets. The module comprises a pressure-reducing device (120), and a distribution valve (16) connected to the pressure-reducing device and to the two outlets. A dual evaporator circuit using such a pressure-reducing module is also proposed. The two evaporators (131, 132) are mounted in parallel. The module receives the fluid coming from a gas cooler via its inlet and delivers the fluid to at least one of the two evaporators (131, 132) via its outlets.

28 Claims, 5 Drawing Sheets

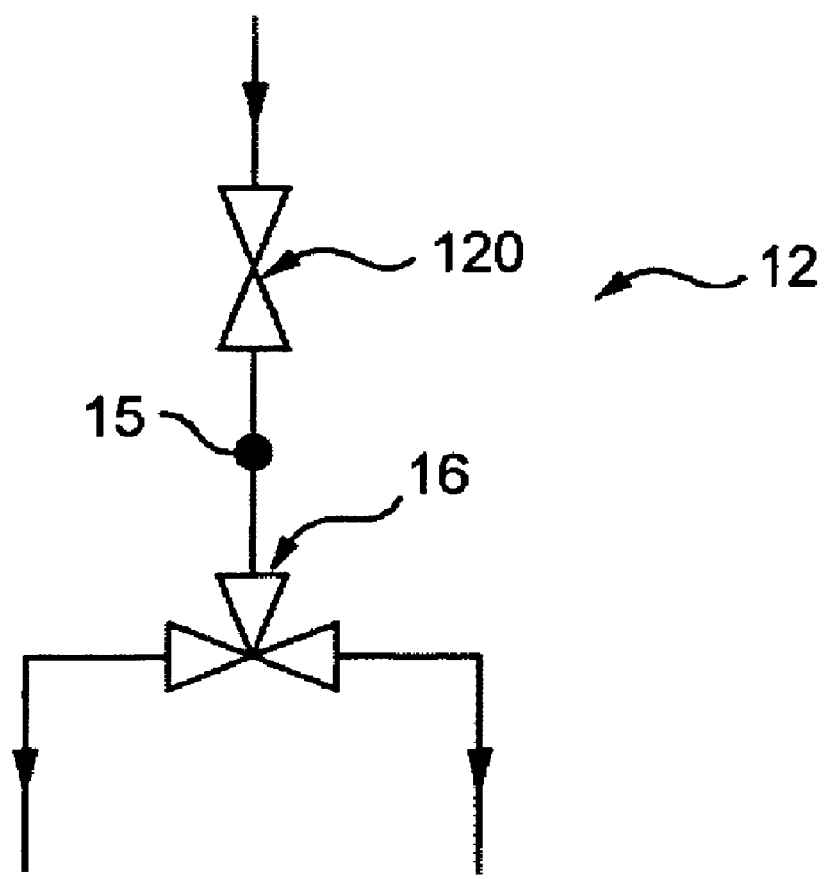

PRESSURE-REDUCING MODULE FOR DUAL EVAPORATOR AIR CONDITIONING SYSTEM

This invention relates to the pressure-reducing modules used in dual evaporator air conditioning systems, in particular for motor vehicles.

Such systems are generally provided in large-size vehicles where the use of a single evaporator is not sufficient to cool the air that circulates inside the cabin.

Typically, one of the evaporators is placed at the front of the vehicle, while the other evaporator is placed at the rear. The two evaporators are then coupled together in order to provide a flow of conditioned air inside the cabin of the vehicle.

Typically, such systems use a low-pressure refrigerant (operation in sub-critical mode), in particular R134A fluid. However, these systems are not suited to high-pressure refrigerants (operation in supercritical mode) such as carbon dioxide (R744).

The U.S. Pat. No. 6,092,379 proposes an air conditioning circuit through which a supercritical refrigerant flows. This circuit is equipped with two evaporators mounted in parallel. A pressure-reducing valve is mounted in each branch upstream from one of the evaporators. The two valves receive the refrigerant that exits from the gas cooler. They are designed to bring the refrigerant that exits from the gas cooler to a pressure determined by the temperature of the fluid at the outlet of the gas cooler, before it is sent to the evaporators.

Thus, this document proposes a dual evaporator air conditioning system suitable for use with a supercritical fluid. However, the proposed system involves a large number of tubes and connections, which increases the risk of leakage, a consequence of operating in supercritical mode with a gas such as carbon dioxide, since pressures are very high, e.g., on the order of 140 bars. Furthermore, the overall structure of the two branches equipped with the evaporators is complex.

The invention improves the situation by proposing a pressure-reducing module for a supercritical refrigerant air conditioning circuit. The module is connected to the circuit via one inlet and two outlets. It comprises a pressure-reducing device and a distribution valve connected to the pressure-reducing device and the two outlets.

The pressure-reducing device and the distribution valve are assembled together so as to form a unitary module.

The pressure-reducing device and the distribution valve are added on to a common block so as to form a unitary whole, the common block having the inlet and outlets.

The pressure-reducing module comprises a pressure relief valve.

The pressure relief valve is placed between the pressure-reducing module and the distribution valve.

The distribution valve is a three-way valve.

The invention further proposes an air conditioning circuit for a motor vehicle, through which a supercritical refrigerant flows, including a compressor, a gas cooler and two evaporators mounted in parallel. The circuit comprises a pressure-reducing module as defined above, receiving the fluid coming from the gas cooler via said inlet and delivering the fluid to at least one of the two evaporators via said outlets.

The system further comprises an internal exchanger arranged so as to enable heat exchange between a portion of the branch connecting the evaporators to the compressor and a portion of the branch connecting the gas cooler to the pressure-reducing module.

The invention also proposes an air-conditioning system equipped with an air conditioning circuit as defined above. The system further comprises a control unit designed to control the distribution valve of the pressure-reducing module.

Optional, additional or substitute characteristics of the air conditioning system of the invention are stated below:

In the presence of an activation command for the two evaporators, the control unit is capable of controlling the distribution valve according to a selected regulation law supplying the valve command signal based on the evaporation temperature of at least one of the evaporators.

The control unit is capable of using the evaporation temperature of the evaporator whose set point is the highest, as a regulation parameter for controlling the distribution valve.

The control unit is capable of using the difference between the evaporation temperatures of the two evaporators as a regulation parameter for controlling the distribution valve.

The air conditioning circuit comprises two temperature sensors capable of measuring the evaporation temperature of the first evaporator and the evaporation temperature of the second evaporator, respectively.

The control unit is capable of using the difference between the evaporation temperature of the first evaporator and an estimate of the evaporation temperature of the second evaporator as a regulation parameter for controlling the distribution valve.

The control unit is capable of calculating the estimate of the evaporation temperature of the second evaporator from the thermal coefficient of the evaporator, from the pressure of the fluid at the outlet of the second evaporator, and from the temperature of the air flow downstream from the second evaporator.

The system comprises a temperature sensor placed near the first evaporator in order to measure the evaporation temperature of the first evaporator.

Each temperature sensor is placed in the superheated area of the associated evaporator or in the air flow passing through the associated evaporator.

The regulation law is a closed-loop regulation supplying the valve command signal based on the deviation between the measurement and the set point of the regulation parameter, in particular a proportional integral derivative regulation.

In the presence of a command to use a single evaporator, the control unit is capable of controlling the opening of the distribution valve so as to send substantially all of the refrigerant towards the evaporator to be used.

The control unit is further capable of controlling the compressor according to a selected regulation law supplying the compressor command signal based on a regulation parameter related to the evaporation temperature of at least one of the evaporators.

The control unit is capable of using the evaporation temperature of the evaporator whose evaporation temperature set point is lowest, as the regulation parameter for controlling the compressor.

The compressor is controlled externally and has a variable displacement.

The first evaporator is placed inside the front air conditioning compartment of the vehicle, the second evaporator being placed in the rear air conditioning compartment of the vehicle.

The invention also proposes a method for controlling the air conditioning circuit defined above, comprising the following steps:

a) determining whether the two evaporators must be used based on passenger demands for cold, and b) if the two evaporators must be used, regulating the distribution valve according to a selected regulation law using the evaporation temperature of at least one of the evaporators as the regulation parameter.

Other characteristics and advantages of the invention will become apparent upon examination of the following detailed description, and the appended drawings in which:

FIG. 6 is a diagram of another embodiment of the pressure-reducing module with a pressure-reducing device and a distribution vale integrated into a single module.

Figure 1:
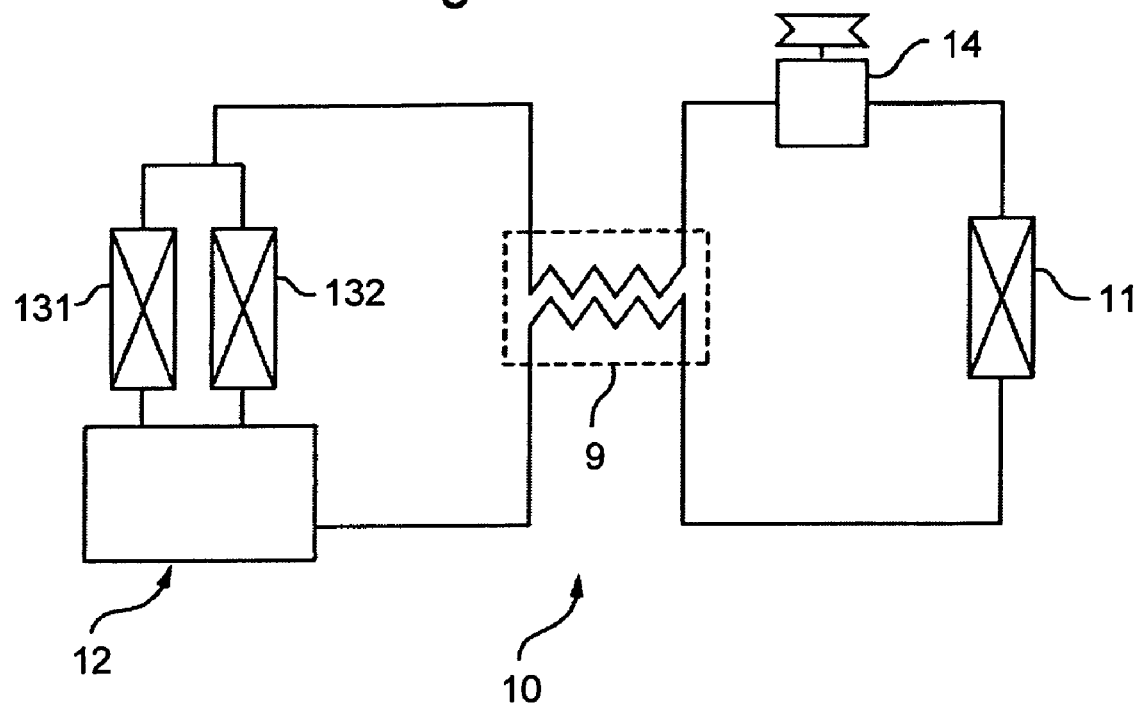
FIG. 1 is a diagram of an air conditioning circuit of the invention.

Reference is first made to FIG. 1, which shows an air conditioning circuit 10 in accordance with the invention.

A CO2-type (R744) refrigerant flows through the air conditioning circuit 10. This circuit 10 comprises:
- a compressor 14 that receives the fluid in the gaseous state at a pressure of P0 and compresses it to a given pressure P1,
- a gas cooler 11 that cools the gas compressed by the compressor, at a substantially constant pressure,
- a pressure-reducing module 12 that lowers the pressure of the fluid coming from the gas cooler 11, while bringing it at least partially to the liquid state, and
- two evaporators 131 and 132 that cause the fluid in the liquid state coming from the pressure-reducing module to pass to the gaseous state, at a substantially constant pressure, in order to produce a flow of conditioned air that is sent towards the cabin of the vehicle. The first evaporator 131 is placed at the front of the cabin and the second evaporator 132 is placed at the rear of the cabin.

The circuit may further comprise an internal heat exchanger 9, enabling the fluid circulating from the gas cooler 11 to the pressure-reducing module 12 to transfer heat to the fluid circulating from the evaporators 131 and 132 to the compressor 14.

Figure 4:
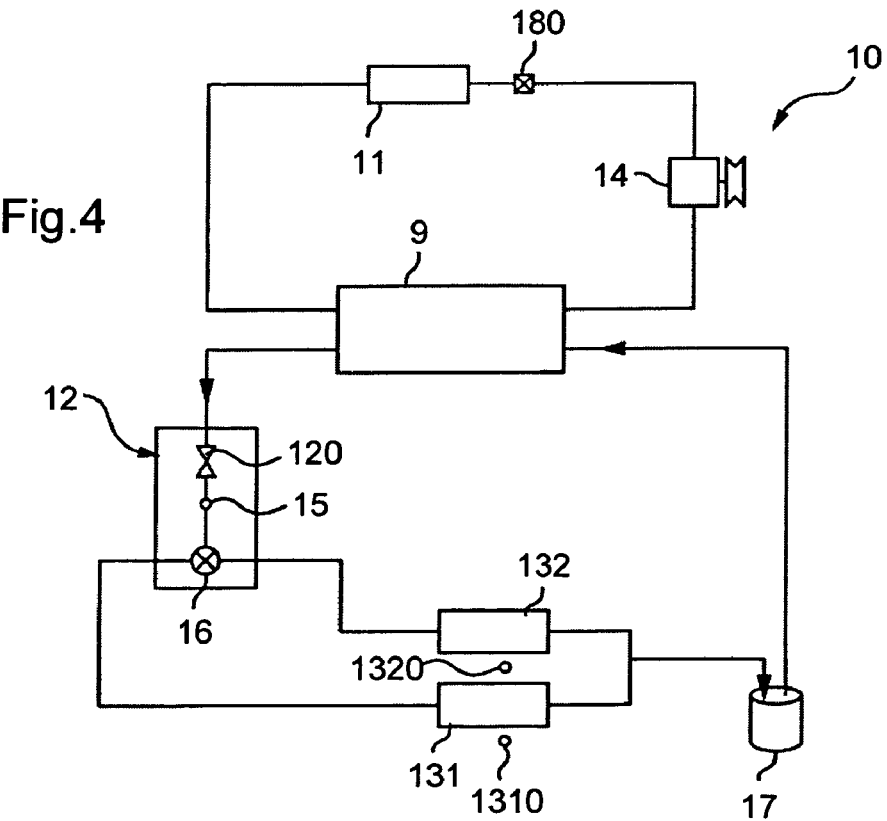
FIG. 4 is a diagram of an air conditioning circuit according to the invention.

An accumulator 17 (FIG. 4) may be provided between the outlet of the evaporators 131 and 132 and the inlet of the compressor 14 in order to prevent slugging.

The gas cooler 11 receives a flow of outside air in order to exhaust the heat withdrawn from the cabin, which, under certain operating conditions, is set into motion by a motor-driven fan.

The evaporators 131 and 132 receive a flow of air from a pulser supplied by an outside air flow, in order to produce a flow of conditioned air.

The first evaporator 131 in particular is placed inside the front air conditioning compartment of the vehicle and is used by the air conditioning system as the main evaporator. The second evaporator 132 is then placed inside the rear air conditioning compartment of the vehicle and is used as an auxiliary evaporator in a so-called secondary air conditioning system.

In an air conditioning circuit operating in a supercritical cycle, the supercritical refrigerant is cooled by the air with which it exchanges heat, in the gas cooler 11, but the exchange is not carried out isothermally, as occurs for a sub-critical fluid circulating in a condenser.

More precisely, the supercritical refrigerant is compressed in the gaseous phase and brought to a high pressure by the compressor 14. Next, the gas cooler 11 cools the refrigerant by means of the entering air flow. As opposed to air conditioning circuits operating in sub-critical mode, the post-compression cooling of the fluid does not bring about a phase change. The fluid passes to the liquid state only during pressure reduction.

Thus, in air conditioning systems operating in a supercritical cycle, the pressure-reducing module performs functions other than the conventional pressure-reducing functions of systems in sub-critical mode: it ensures control of the high pressure of the fluid, which makes it possible to optimize both the refrigerating capacity as well as the efficiency of the system. These particular functions require a structure customized to the pressure-reducing module, regulation of the distribution of fluid to the evaporators, and variable displacement system components.

Figure 2:
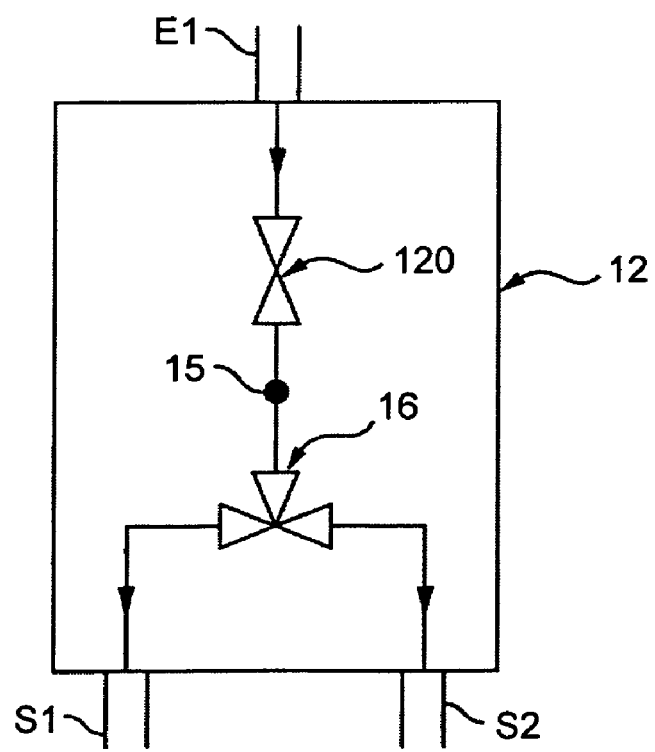
FIG. 2 is a diagram of the pressure-reducing module according to the invention.

FIG. 2 is a diagram showing the pressure-reducing module 12 of the invention, in greater detail.

The pressure-reducing module is integrated with the above air conditioning circuit 10 via an inlet E1 and two outlets S1 and S2. The inlet E1 receives the refrigerant coming from the gas cooler 11. After having passed through the pressure-reducing module 12, the refrigerant can exit therefrom via the outlets S1 and S2, in the direction of the evaporators 131 and 132, respectively. The pressure-reducing module 12 has one branch equipped with a pressure-reducing device 120, as well as a distribution valve 16 connected to the pressure-reducing device 120 and to the two outlets S1 and S2. The pressure-reducing device 120 and the distribution valve 16 are thus mounted in series. The distribution valve 16 is in particular a three-way valve distributing the fluid that exits from the pressure-reducing device 12 to the evaporators.

The distribution valve 16 makes it possible to adjust the proportion of fluid being sent to each of the two evaporators 131 and 132, based on the requirements for cold. It further makes it possible to operate a single evaporator 131 or the two evaporators 131 and 132, as required.

The pressure-reducing module 12 can also be equipped with a pressure relief valve 15 in order to protect the evaporators, the excess pressure being sent towards the outside of the air conditioning circuit. This pressure relief valve is interposed between the pressure-reducing device 120 and the distribution valve 16.

The pressure-reducing device 120 ensures expansion of the refrigerant $CO_2$ that passes through it, while at the same time guaranteeing optimization of the high pressure. It may be of the mechanical or electrical type.

The pressure-reducing device 120 and the distribution valve 16 can be integrated into a single module, as shown diagrammatically in FIG. 6, in order to reduce the cost of the system. Thus, they can be assembled together so as to form a unitary module. As an alternative, they can be added on to a common block, as shown diagrammatically in FIG. 2, so as to form a unitary whole. This common block then has the inlet E1 and the outlets S1 and S2.

Figure 3:
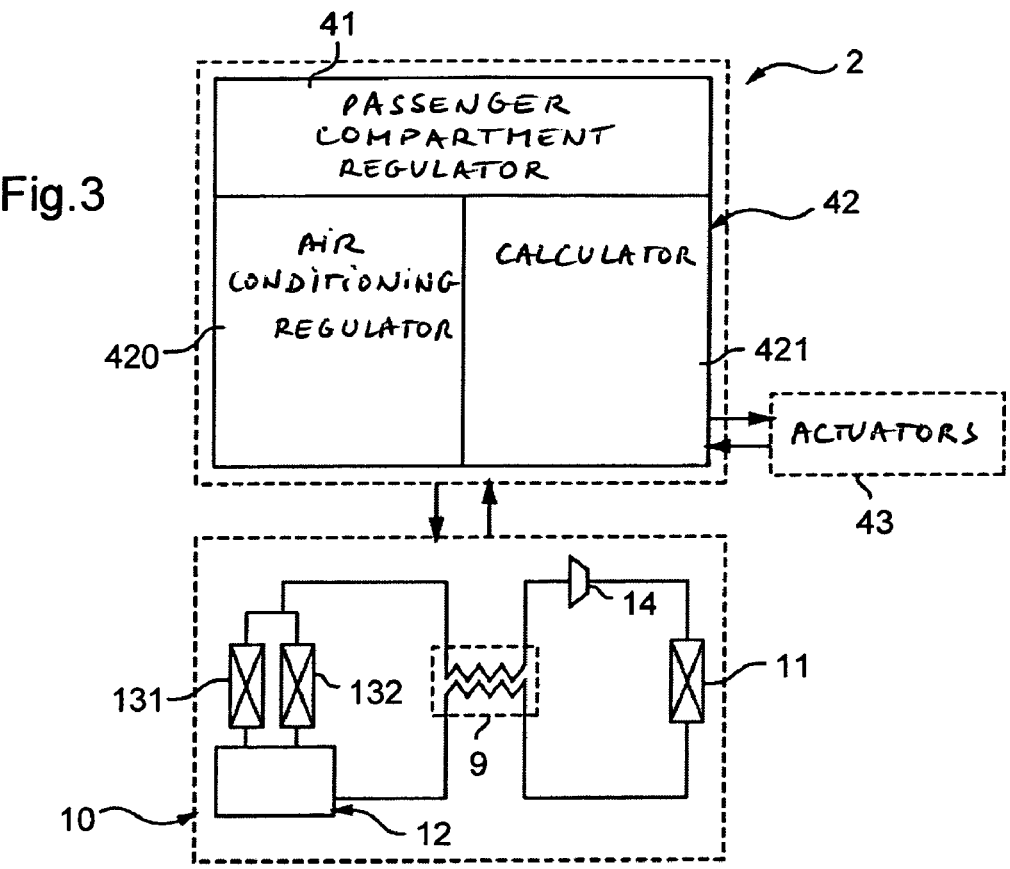
FIG. 3 is a diagram of the air conditioning system of the invention.

Reference is now made to FIG. 3, which is an overall view of an air conditioning system 2 in accordance with the invention.

The system 2 is equipped with the air conditioning circuit 10, provided with the pressure-reducing module 12 of the invention.

The system 2 is equipped with a control unit 42 and a cabin regulator 41. The control unit 42 determines the command signals of variable displacement components of the system in order to optimize the refrigerating capacity.

The control unit 42 consists of an air conditioning regulator 420 that regulates the system components and a calculator 421 that calculates the command signals for the externally controlled components of the circuit 10, based on information transmitted by the sensors. The distribution valve 16, and the compressor, when it is equipped with a control valve, constitute such externally controlled components, for example. The control unit 42 further interacts with actuators 43, e.g., like the control valve of the compressor. These actuators apply the calculated command signals to the components.

The cabin regulator 41 is intended to set the temperature set point of the pulsed air at the inlet of the evaporators 131 and 132, and provides the set point temperatures for the evaporators 131 and 132.

The proposed air conditioning system is provided to enable a supercritical cycle operation of the circuit 10 that is compatible with the use of two evaporators 131, 132. To do so, it uses, in particular, the pressure-reducing module 12, which ensures not only expansion of the refrigerant, but also optimization of the refrigerant flow rate. Furthermore, the system is designed to strictly control the evaporators and, in particular, the evaporation temperatures of the evaporators, in order to reach a refrigerating capacity that meets the needs of the passengers in the vehicle.

The system of the invention can operate in two distinct modes:
 in a first mode, wherein only one of the two evaporators 131 or 132 is actuated;
 in a second mode, wherein the two evaporators 131 and 132 are actuated simultaneously.

In the mode where the two evaporators are actuated, the control unit 42 implements a selected regulation law in order to control the distribution valve 16, based on a regulation parameter, and therefore the distribution of the refrigerant exiting the pressure-reducing device 120 between the two evaporators 131 and 132. This regulation of the distribution valve 16 is implemented so as to optimize the coefficient of performance COP of the air conditioning system.

The control unit 42 pre-determines the regulation parameter for the distribution valve being used. The regulation parameter relates advantageously to the evaporation temperature Te1 or Te2 of at least one of the evaporators 131 and 132.

Thus, this law makes it possible to regulate the flow of fluid sent by the distribution valve to the first evaporator and/or to the second evaporator, based on the evaporation temperature of at least one of the evaporators.

In order to regulate the distribution valve 16, the control unit of the invention can also take into account the evaporation temperature set points of the evaporators 131 and 132 so as to provide the refrigerating capacity required by the user. These temperature set points represent the demands for cold of the passengers of the vehicle, e.g., at the front and the rear of the vehicle.

The regulation law can be, for example, a closed-loop regulation law.

Conventional closed-loop regulation laws, e.g., proportional integral derivative regulation PID, supply the command signal $S_{command}$ for a variable displacement and externally controlled component using the deviation between the measurement M and the set point C of a given regulation parameter, and apply this command signal to the component until the deviation between the measurement M and the set point C of the regulation parameter is zero. The characteristic of a PID-type regulation is given by the equation A1 of Appendix A. This equation provides the command signal $S_{command}$ for the component concerned, based on the measurement M and the set point C of the regulation parameter.

Within the framework of the invention, the control unit applies such a closed-loop regulation law in order to make it possible to control the distribution valve 16.

The closed-loop regulation law supplies the command signal for the distribution valve 16 based on the deviation between the measurement M and the set point C of a parameter relating to the evaporation temperature of at least one of the evaporators 131 and 132.

After having determined the regulation parameter to be used, the control unit 42 receives the measurement M and the set point C of the regulation parameter. Next, the air conditioning regulator 420 of the control unit implements the PID regulation until the deviation between the measurement M and the set point C of the regulation parameter is close to zero. The command signals are calculated by the calculator 421 according to a relationship of the A1 relationship type, and are then applied to the components by the actuators 43.

Additionally, when the compressor 14 is an externally controlled and variable displacement compressor, the control unit 42 is also customized to control the compressor according to a regulation law using a regulation parameter relating to the evaporation temperature Te1 or Te2 of at least one of the evaporators 131 or 132. Thus, this regulation law is customized to supply the command signal for the compressor based on the evaporation temperature Te1 or Te2 of at least one of the evaporators. This law can also take into account the evaporation temperature set points of at least one of the evaporators 131 and 132.

This regulation law can also be a closed-loop regulation law supplying the command signal for the compressor based on the deviation between the measurement M and the set point C of the regulation parameter. This closed regulation law, for example, can be a proportional integral derivative regulation PID.

An externally controlled compressor is equipped with a control valve whose intensity Iv varies in response to the command signal applied by the actuators 43. The control of the compressor 14 according to the invention makes it possible to optimize the refrigerating capacity of the air conditioning circuit.

Although the invention may be applied to other types of compressors, e.g., internally controlled clutch compressors, throughout the remainder of the description, and for non-limiting illustrative purposes, the compressor 14 will be considered to be an externally controlled and variable displacement compressor.

The air conditioning circuit 10 can be equipped with two temperature sensors: a first temperature sensor 1310, placed near the first evaporator 131, in order to measure its evaporation temperature Te1, and a second temperature sensor 1320, placed near the second evaporator 132, in order to measure its evaporation temperature Te2.

As an alternative, a single sensor 1310 can be provided near the first evaporator 131, in order to measure its evaporation temperature Te1.

The number of sensors depends on the regulation parameter defined to regulate the distribution valve or the compressor.

Each sensor 1310 (1320, respectively) provides the evaporation temperature Te1 (Te2, respectively) for the associated evaporator 131 (132, respectively). The sensor is placed behind the associated evaporator 131 (132, respectively), in its superheated area, or else in the air flow passing through the evaporator. The measurements supplied by the sensors provide information about the filling level of the evaporators.

Throughout the remainder of the description, and for non-limiting illustrative purposes, the regulation law used will be considered to be a closed-loop regulation law.

The method for controlling the distribution valve 16 and the compressor 14 will now be described with reference to FIGS. 5A and 5B.

Figure 5A:
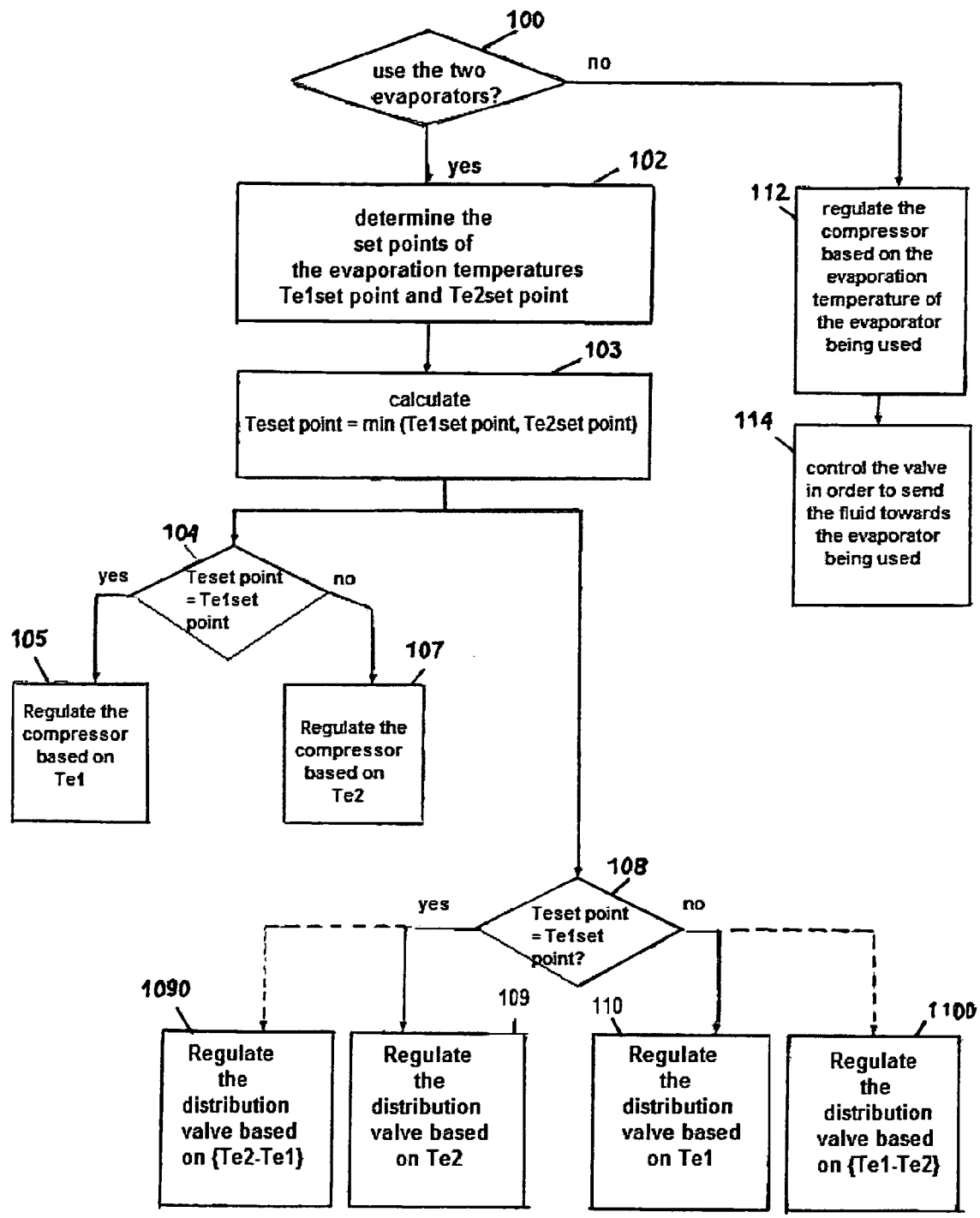
FIG. 5A is a flowchart showing the control of the distribution valve and the compressor according to the invention.

FIG. 5A is a flowchart showing the steps for controlling the distribution valve 16 and the compressor 14, when the air conditioning circuit 10 is equipped with two sensors 1310 and 1320 for measuring the evaporation temperatures Te1 and Te2 of the evaporators 131 and 132, respectively.

Figure 5B:
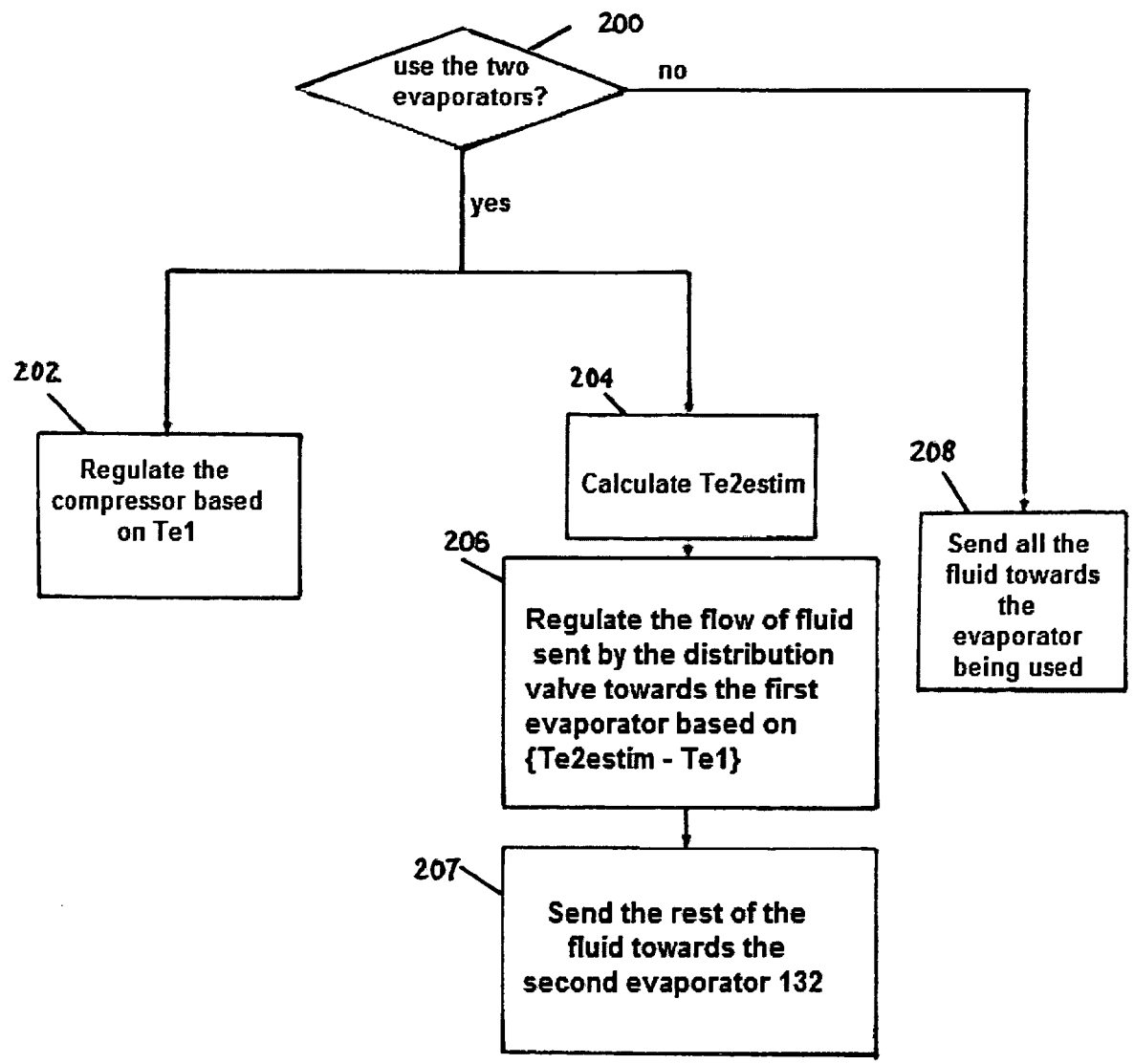
FIG. 5B is a flowchart showing an alternative control of the distribution valve and the compressor according to the invention.

FIG. 5B is a flowchart showing the steps for controlling the distribution valve 16 and the compressor 14, when the air conditioning circuit 10 is equipped with a single sensor 1310 measuring the evaporation temperature Te1 of the evaporator 131.

Reference is made first of all to FIG. 5A. The air conditioning circuit 10 is equipped here with two sensors 1310 and 1320.

In step 100, the control unit 42 determines whether the two evaporators must be used. The use of one or both evaporators 131 and 132 depends on the temperature control indicated by a passenger on the cabin control panel. For example, when a lowering of temperature at the rear of the vehicle is requested on the control panel, the second evaporator will be used. In this example, the capacity of the compressor and/or the flow rate of refrigerant towards the second evaporator 132 dedicated to the rear area of the cabin will be increased.

If both evaporators must be used, then in step 102 the cabin regulator 41 supplies the calculator 421 with the respective evaporation temperature set points $Te1_{set\ point}$ and $Te2_{set\ point}$ for the evaporator 131 and the evaporator 132.

In step 103, the calculator 421 determines a minimum set point value $Te_{set\ point}$ corresponding to the lowest value between the evaporation temperature set point $Te1_{set\ point}$ for the first evaporator 131 and the evaporation temperature set point $Te2_{set\ point}$ for the second evaporator 132.

If it is determined in step 104 that the minimum set point value $Te_{set\ point}$ is the evaporation temperature set point $Te1_{set\ point}$ for the first evaporator, then, in step 105, the control unit 42 uses the evaporation temperature for the first evaporator Te1 as the regulation parameter for regulating the compressor 14. The measurement of the evaporation temperature $Te1_{measured}$ of the first evaporator 131 is supplied to the calculator 421 by the sensor 1310.

For example, when the regulation law is a closed-loop regulation, the command signal for the compressor control valve $S_{command}$ is calculated according to a relationship similar to A1 and is applied to the compressor 14 based on the deviation between the measurement $Te1_{measured}$ and the evaporation temperature set point $Te1_{set\ point}$ for the first evaporator.

On the other hand, if it is determined in step 104 that the minimum set point value $Te_{set\ point}$ is the evaporation temperature set point $Te2_{set\ point}$ for the second evaporator, the control unit 42 uses the evaporation temperature of the second evaporator Te2 as the regulation parameter for controlling the compressor 14 in step 107. The measurement of the evaporation temperature $Te2_{measured}$ of the second evaporator 132 is supplied by the second sensor 1320.

For example, when the regulation law is a closed-loop regulation, the command signal for the compressor control valve $S_{command}$ is calculated according to a relationship similar to A1, based on the deviation between the measurement $Te2_{measured}$ and the evaporation temperature set point $Te2_{set\ point}$ for the second evaporator.

The regulation of the distribution valve 16 will now be described.

If it is determined in step 108 that the minimum set point value $Te_{set\ point}$ is the evaporation temperature set point $Te1_{set\ point}$ for the first evaporator, the control unit uses the evaporation temperature of the second evaporator Te2 as the regulation parameter for regulating the distribution valve 16 in step 109. The measurement of the evaporation temperature $Te2_{measured}$ of the second evaporator 132 is supplied by the second sensor 1320.

For example, when the regulation law is a closed-loop law, the command signal for the compressor control valve $S_{command}$ is calculated according to a relationship A1, based on the deviation between the measurement $Te2_{measured}$ and the evaporation temperature set point $Te2_{set\ point}$ for the second evaporator.

When it is determined in step 108 that the minimum set point value $Te_{set\ point}$ is the evaporation temperature set point $Te1_{set\ point}$ for the first evaporator, the control unit 42 can, in step 1090, alternatively use the difference {Te2−Te1} between the evaporation temperature of the second evaporator Te2 and the evaporation temperature of the first evaporator Te1 as the regulation parameter for controlling the distribution valve 16. The measurement of the evaporation temperature $Te1_{measured}$ of the first evaporator 131 and the measurement of the evaporation temperature $Te2_{measured}$ of the second evaporator 132 are supplied by the sensors 1310 and 1320, respectively.

In the example of a closed-loop regulation law, the command signal for the compressor control valve $S_{command}$ is thus calculated according to a relationship similar to A1, based on the deviation between the measurement {$Te2_{measured}$−$Te1_{measured}$} and a set point relating to the evaporation temperature set point $Te1_{set\ point}$ and $Te2_{set\ point}$ for at least one of the evaporators 131 and 132.

On the other hand, if it is determined in step 108 that the minimum set point value $Te_{set\ point}$ is the evaporation temperature set point $Te2_{set\ point}$ for the second evaporator, then, in step 110, the control unit 42 uses the evaporation temperature of the first evaporator Te1 as the regulation parameter for controlling the valve 16. The measurement of the evaporation temperature $Te1_{measured}$ of the first evaporator 131 is supplied to the calculator 421 by the sensor 1310.

As an alternative, in step 1100, the control unit 42 can also use the difference between the evaporation temperatures of the two evaporators {Te1-Te2} as the regulation parameter for controlling the distribution valve 16. The measurements of the evaporation temperature $Te1_{measured}$ and $Te2_{measured}$ of the first evaporator 131 and the second evaporator 132 are supplied by the sensors 1310 and 1320, respectively.

For example, for a closed-loop regulation law, the command signal for the distribution valve $S_{command}$ is calculated according to a relation similar to A1, based on the deviation between the measurement $Te1_{measured}$ and the evaporation temperature set point $Te1_{set\ point}$ for the first evaporator (step 110), or, as an alternative, based on the deviation between the measurement {$Te1_{measured}$-$Te2_{measured}$} and a set point relating to the evaporation temperature set point $Te1_{set\ point}$ and $Te2_{set\ point}$ of at least one of the evaporators 131 and 132 (step 1110). The single evaporator operating mode, e.g., when the demand for cold comes only from the front or only from the rear of the vehicle, will now be described.

More precisely, when it is determined in step 100 that a single evaporator must be used, e.g., the first evaporator 131, the control unit uses the evaporation temperature of this evaporator as the regulation parameter for regulating the compressor 14 in step 112. The measurement of this evaporation temperature is supplied by the sensor associated with the evaporator, e.g., by the sensor 1310.

Furthermore, when a single evaporator must be used, e.g., the first evaporator 131, the control unit 42 regulates the distribution valve 16 so as to send the fluid only towards the evaporator being used, in this case the first evaporator 131, in step 114.

Reference is now made to FIG. 5B. In this embodiment, the circuit 10 is equipped with only a single temperature sensor, in particular the sensor 1310 of the main evaporator 131. In the following description, it will be considered that only this sensor 1310 is used.

In this embodiment, the control unit 42 regulates the distribution valve 16 so as to optimize the filling of the main evaporator equipped with the sensor, in this case the evaporator 131. The other evaporator 132 is then filled with the remaining refrigerant.

The method for controlling the distribution valve 16 and the compressor 14 will now be described with reference to FIG. 5B.

In step 200, the control unit 42 determines whether both evaporators must be used. A single evaporator 131 or 132 will be used if the passengers requested cold only at the front of the vehicle or only at the rear of the vehicle. The two evaporators 131 and 132 will be used if the passengers requested cold both at the front of the vehicle as well as the rear of the vehicle.

If the two evaporators must be used, the control unit 42 uses, in step 202, the evaporation temperature of the first evaporator Te1 as the regulation parameter for controlling the compressor 14. The measurement of the evaporation temperature $Te1_{measured}$ of the first evaporator 131 is supplied to the control unit 42 by the sensor 1310, placed near the main evaporator 131.

For example, the regulation law is closed-looped, like the PID regulation given by the relationship A1. The command signal for the compressor control valve $S_{command}$ is then calculated based on the deviation between the measurement $Te1_{measured}$ of the evaporation temperature of the first evaporator and a temperature set point $Te_{set point}$. The cabin regulator 41 can additionally provide the control unit 42 with the respective evaporation temperature set points $Te1_{set point}$ and $Te2_{set point}$ for the evaporator 131 and the evaporator 132. The temperature set point $Te_{set point}$ can then be the lowest value between the evaporation temperature set point $Te1_{set point}$ for the first evaporator 131 and the evaporation temperature set point $Te2_{set point}$ for the second evaporator 132.

In the case where only the rear passengers request cold, the compressor regulation then uses the temperature $Te2_{estim}$, as determined below.

The regulation of the distribution valve will now be described.

In step 204, the calculator 421 calculates an estimate of the evaporation temperature of the second evaporator $Te2_{estim}$, according to the relationship A1 of Appendix A, from:
- the thermal coefficient of the second evaporator $K_{eff}$;
- from an estimate of the pressure $P_{outlet-132}$ of the refrigerant at the outlet of the second evaporator 132; and
- from the temperature $T_{air-upstream}$ of the air flow upstream from the second evaporator 132.

The thermal coefficient of the second evaporator $K_{eff}$ can be calculated from the voltage of the air pulser $U_{puls-132}$ for the second evaporator 132, the travel speed of the vehicle Ts, and the minimum set point value $Te_{set}$ point.

The pressure $P_{outlet-132}$ of the refrigerant at the outlet of the second evaporator 132 can be estimated from the suction pressure $P_{suct}$ of the compressor 14.

The temperature $T_{air-upstream}$ of the air flow upstream from the second evaporator can be estimated or measured.

In step 206, the control unit 42 uses the difference $\{Te2_{estim}-Te1\}$ between the estimated evaporation temperature of the second evaporator $Te2_{estim}$ and the evaporation temperature of the first evaporator Te1, as the regulation parameter for controlling the distribution valve. The measurement of the evaporation temperature $Te1_{measured}$ of the first evaporator 131 is supplied by the sensor 1310.

The control of the distribution valve using the difference $\{Te2_{estim}-Te1\}$ between the estimated evaporation temperature of the second evaporator $Te2_{estim}$ and the evaporation temperature of the first evaporator Te1 makes it possible to guarantee the flow equilibrium between the two evaporators and especially makes it possible to prevent overheating in the second evaporator. If the temperature difference exceeds a specific threshold, the distribution valve makes a correction by sending a greater flow towards the second evaporator. If this flow modification affects the temperature in the first evaporator too much, then the compressor takes over by supplying a greater flow.

When it is determined in step 200 that a single evaporator must be used, e.g., if the passengers requested cold only at the front or only at the rear of the vehicle, in step 208, the distribution valve 16 is controlled so as to send all of the fluid towards the evaporator being used, e.g., the first evaporator 131, if a passenger has requested cold at the front of the vehicle.

The invention enables distribution of the refrigerant at the outlet of the pressure-reducing device 120, thereby guaranteeing optimization of the high pressure and the refrigerating capacity of the air conditioning circuit 10.

The system of the invention also makes it possible to improve the oil return into the compressor. When the compressor capacity is low over a rather long time period, there is actually a risk that the oil will become trapped in either of the evaporators, which, in time, may cause the compressor to run without oil and thus damage it.

In order to resolve this problem, the control unit 42 is capable of periodically controlling the distribution valve 16 so that it quickly increases the flow of refrigerant sent towards the secondary evaporator 132, in order to discharge the oil trapped inside the evaporator, which, as a result, will then be sent to the compressor. The amount of lubricating oil that arrives at the compressor is thereby increased.

Additionally, in order to prevent excess pressure in the evaporators, the control unit 42 can monitor the outlet parameters of the gas cooler 11. Thus, a temperature and pressure sensor 180 (or separate pressure and temperature sensors) can be provided at the outlet of the gas cooler 11. This supplies the control unit 42 of the invention with a measurement of the temperature $T_m$ and pressure $P_m$ of the fluid at the outlet of the gas cooler 11. The control unit 42 compares the measured temperature $T_m$ to a preset threshold temperature $T_{lim}$ and the measured pressure $P_m$ to a threshold pressure $P_{lim}$. When the measured values exceed the thresholds, the control unit 42 reduces the compressor displacement so as to reduce the temperature and pressure values of the fluid at the outlet of the gas cooler 11. The control unit continues to monitor these values measured by the sensor 180 by regularly comparing them to the thresholds, and stops the air conditioning if these values nevertheless continue to rise.

In this embodiment, the pressure relief valve 15 comes into play only if the control unit 42 is not successful in protecting the air conditioning circuit by monitoring the outlet parameters of the gas cooler 11.

The invention enables the use of two evaporators while at the same time ensuring effective control of the expansion of the refrigerant. It ensures distribution of the refrigerant between the two evaporators that is compatible with optimizing the high pressure of the refrigerant. Regulation of the distribution valve 16 enables the activation of a single evaporator or both of them, as required. The number of sensors used on the air conditioning loop of the invention is substantially the same as that of conventional, single evaporator air conditioning loops. The pressure-reducing module 12 otherwise consists of standard components that can be integrated together. Thus, the system of the invention can therefore be produced at least cost.

Although the invention applies to air conditioning loops consisting of any type of compressor, it is particularly advantageous when the compressor is an externally controlled and variable displacement compressor.

Furthermore, the invention is not limited to closed-loop regulations for controlling the distribution valve 16 and the compressor 14. As a matter of fact, any law for regulating the distribution valve and any law for regulating the compressor that uses a regulation parameter relating to the evaporation temperature of one of the evaporators can be used within the scope of the invention.

Regulation of the compressor and regulation of the distribution valve can be implemented independently of one another and according to different regulation laws. Thus, although, with reference to FIGS. 5A and 5B, the regulation of the distribution valve was described in succession to that of the compressor, these two regulations can be implemented in parallel, independently of one another. In certain embodiments, it might even be anticipated to implement only the regulation of the distribution valve.

Furthermore, the invention is not limited to the embodiments described above. It encompasses all alternative embodiments that may be anticipated by those skilled in the art. In particular, the pressure-reducing device 120 may assume any shape suited to an air conditioning circuit operating in a supercritical cycle.

APPENDIX A

A1:

$$S_{command} = +/- G(M-C) + (G/Ti) \int_{0;t}(M-C)dt + G.t_d * d(M-C)/dt) + S_0$$

A2:

$$Te2_{estim} = f(K_{eff}; P_{outlet-131}; T_{air\_upstream})$$

A3:

$$S = g(T_s, U_{puls1}, T_{amb}, T_{inlet-11}, T_{outlet-11}, P_{suct}, Iv)$$

The invention claimed is:

1. An air conditioning circuit (10), for a motor vehicle, through which a supercritical refrigerant flows, said air conditioning circuit (10) including a gas cooler (11), at least two evaporators (131, 132) mounted in parallel, and a pressure-reducing module connected to said circuit (10) via one inlet and two outlets disposed downstream of said inlet, wherein said pressure-reducing module comprises a pressure-reducing device (120) and a distribution valve (16) connected in series to said pressure-reducing device and to the two outlets, wherein said pressure-reducing module receives the refrigerant coming from said gas cooler via said inlet and delivers the refrigerant to at least one of said evaporators (131, 132) via said outlets, and wherein all the refrigerant passing through the pressure-reducing module (12) is distributed by the distribution valve (16) towards at least one of said evaporators (131, 132), and wherein said distribution valve (16) adjusts the proportion of fluid delivered to said evaporators (131, 132) to optimize refrigerating capacity.

2. The air conditioning circuit (10) of claim 1, characterized in that the pressure-reducing device (120) and the distribution valve (16) are assembled together so as to form a unitary module.

3. The air conditioning circuit (10) of claim 1, characterized in that the pressure-reducing device (120) and the distribution valve (16) are added on to a common block so as to form a unitary whole, the common block having said inlet and said outlets.

4. The air conditioning circuit (10) as claimed in claim 1, characterized in that the pressure-reducing module (12) comprises a pressure relief valve (15).

5. The air conditioning circuit (10) of claim 4, characterized in that the pressure relief valve is placed between the pressure-reducing device (120) and the distribution valve (16).

6. The air conditioning circuit (10) as claimed in claim 1, characterized in that the distribution valve (16) is a three-way valve.

7. The air conditioning circuit (10) of claim 1, including a compressor (14) disposed upstream of said gas cooler (11).

8. The air conditioning circuit of claim 7, further comprising an internal exchanger (9) arranged so as to enable heat exchange between a portion of a branch connecting the evaporators (131, 132) to the compressor (14) and a portion of a branch connecting the gas cooler (11) to the pressure-reducing module (12).

9. An air conditioning system comprising:
an air conditioning circuit (10) through which a supercritical refrigerant flows,
said air conditioning circuit (10) including a gas cooler (11), at least two evaporators (131, 132) mounted in parallel, and a pressure-reducing module connected to said circuit (10) via one inlet and two outlets disposed downstream of said inlet,
wherein said pressure-reducing module comprises a pressure-reducing device (120) and a distribution valve (16) connected to said pressure-reducing device and to the two outlets,
wherein said pressure-reducing module receives the fluid coming from said gas cooler via said inlet and delivers the fluid to at least one of said evaporators (131, 132) via said outlets, and
a control unit (42) designed to control the distribution valve (16) of the pressure-reducing module to adjust the proportion of fluid delivered to the evaporators (131, 132) to optimize refrigerating capacity.

10. The system of claim 9, characterized in that, in the presence of an activation command for the two evaporators, the control unit (42) is capable of controlling the distribution valve (16) according to a selected regulation law supplying a valve command signal based on the evaporation temperature of at least one of the evaporators (131, 132).

11. The system of claim 10, characterized in that the control unit is capable of using the evaporation temperature of the evaporator (131, 132) whose set point is the highest, as a regulation parameter for controlling the distribution valve (16).

12. The system of claim 11, characterized in that the control unit (42) is capable of using the difference between the evaporation temperatures of the two evaporators (131, 132) as a regulation parameter for controlling the distribution valve (16).

13. The system as claimed in claim 11, characterized in that the air conditioning circuit (10) comprises two temperature sensors (1310, 1320) capable of measuring the evaporation temperature of the first evaporator (131) and the evaporation temperature of the second evaporator (132), respectively.

14. The system of claim 10, characterized in that the control unit (42) is capable of using the difference between the evaporation temperature of the first evaporator (131) and an estimate of the evaporation temperature of the second evaporator (132) as a regulation parameter for controlling the distribution valve (16).

15. The system of claim 14, characterized in that the control unit (42) is capable of calculating the estimate of the evaporation temperature (Te2.sup.estim) of the second evaporator from the thermal coefficient (K.sub.eff) of the evaporator, from the pressure of the fluid at the outlet of the second evaporator (P.sub.outlet-ev), and from the temperature (T.sub.outlet-air) the air flow downstream from the second evaporator (132).

16. The system as claimed in claim 14, further comprising a temperature sensor placed near the first evaporator (131) in order to measure the evaporation temperature of the first evaporator (131).

17. The system as claimed in claim 13, characterized in that each temperature sensor is placed in the superheated area of the associated evaporator or in an air flow passing through the associated evaporator.

18. The system as claimed in claim 10, characterized in that the regulation law is a closed-loop regulation supplying the command signal for the valve based on the deviation between the measurement and the set point of the regulation parameter.

19. The system of claim 18, characterized in that the closed-loop regulation law is a proportional integral derivative regulation.

20. The system of claim 9, characterized in that, in the presence of a command to use a single evaporator, the control unit (42) is capable of controlling the opening of the distribution valve so as to send substantially all of the refrigerant towards the evaporator being used.

21. The system as claimed in claim 9, characterized in that the control unit (42) is further capable of controlling the compressor (14) according to a selected regulation law supplying a compressor command signal based on a regulation parameter related to the evaporation temperature of at least one of the evaporators (131, 132).

22. The system of claim 21, characterized in that the control unit (42) is capable of using the evaporation temperature (Te1, Te2) of the evaporator whose evaporation temperature set point (Te1$_{set\,point}$, Te2$_{set\,point}$) is the lowest, as the regulation parameter for controlling the compressor.

23. The system as claimed in one of claims 21 and 22, characterized in that the compressor (14) is controlled externally and has a variable displacement.

24. The system as claimed in claim 9, characterized in that the first evaporator is placed inside a front air conditioning compartment of a vehicle, and in that the second evaporator is placed inside a rear air conditioning compartment of the vehicle.

25. The air conditioning circuit (10) as claimed in claim 1, characterized in that said distribution valve (16) is disposed between said pressure reducing device and said two outlets.

26. The system as claimed in claim 9, characterized in that said distribution valve (16) is disposed between said pressure reducing device and said two outlets.

27. The air conditioning circuit (10) as claimed in claim 1, characterized in that the distribution valve (16) is fluidically directly connected to the two evaporators.

28. The air conditioning circuit of claim 1, further comprising two temperature sensors (1310, 1320) capable of measuring the evaporation temperature of the first evaporator (131) and the evaporation temperature of the second evaporator (132), respectively.

* * * * *